Sept. 29, 1959     R. L. DAUGHERTY     2,906,131
CONTROLLER
Filed Feb. 16, 1956                                 2 Sheets-Sheet 1
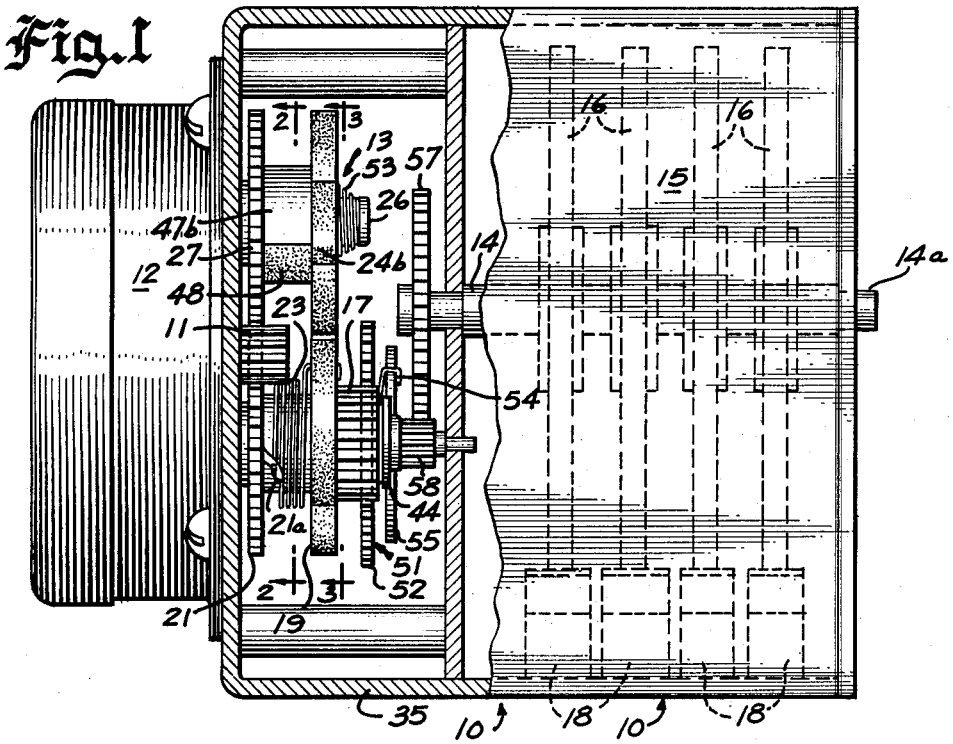
INVENTOR
Robert L. Daugherty
by
Mason, Kolehmainen, Rathburn and Wyss
ATTORNEYS

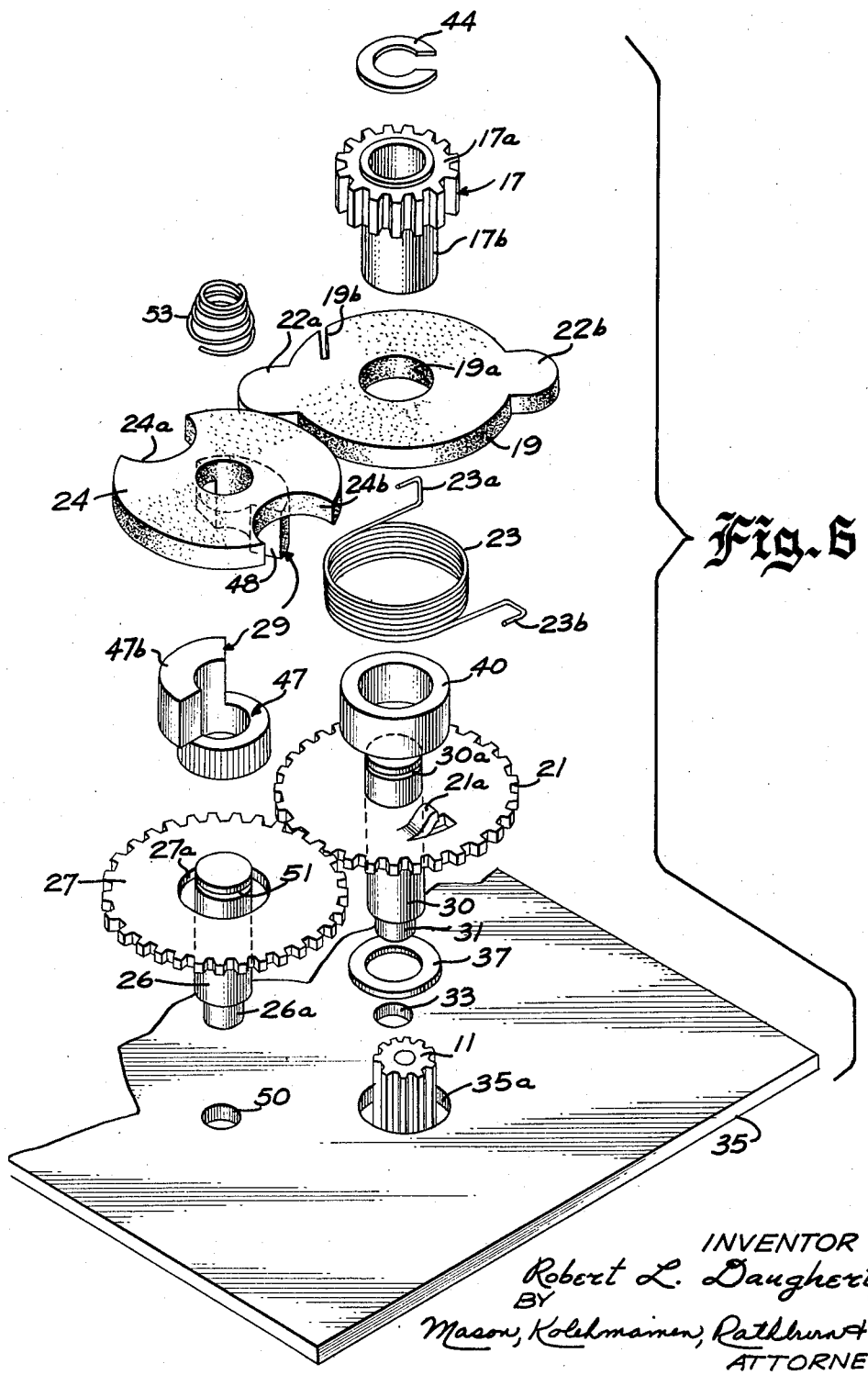

United States Patent Office 2,906,131
Patented Sept. 29, 1959

2,906,131

CONTROLLER

Robert L. Daugherty, Reedsburg, Wis., assignor to Robertshaw-Fulton Controls Company, Richmond, Va., a corporation of Delaware Application February 16, 1956, Serial No. 566,028

8 Claims. (Cl. 74—84)

The present invention relates to controllers, and more particularly to timers for controlling the operation of power driven apparatus, and the invention has for an object the provision of improved controllers of the character hereinafter indicated. Specifically, this invention, while not limited thereto, is particularly adapted for use in controlling the operation of automatic dishwashers, clothes washers or the like.

There have heretofore been available on the market devices variously termed controllers or timers for sequentially operating control switches or devices which selectively supply electric current or other energizing media to various parts of automatic power operated appliances in order to effect the automatic operation thereof. In those instances where it is only necessary to energize an electrically operated appliance at one time and to deenergize it at another, a single control switch suffices and relatively expensive snap-acting type switches may be employed to minimize contact arcing without excessively increasing the over-all cost of each appliance. However, in those appliances which have a relatively complex operating cycle, such as automatic dishwashers and clothes washers, it is common to employ a large number of switches arranged in a bank with a single motor driven control member for rotating a plurality of cams which function selectively to actuate these switches. To equip each of the switches in such an appliance with an individual snap-acting mechanism appreciably increases the cost of the final product. Unfortunately, moreover, the operating cycle of such appliances is usually quite long, sometimes extending through a full thirty minutes, and unless complicated switch control motors and accessories are provided, the switch actuating control member must rotate at a relatively slow speed, so that in the absence of snap-acting switches, excessive contact arcing in the switches quickly renders the over-all device inoperative.

In order to enable the use of ordinary switches, which are much less expensive than the snap-acting type, it has been suggested to provide a timer which operates the control member for a bank of switches in rapid, incremental steps so that although the switch control shaft has a relatively low over-all angular velocity, the switch contacts themselves are rapidly opened and closed as the various operations of the appliance are sequentially selected by the timer. The use of snap-acting switches may thus be obviated, but the incrementally operated timers known in the prior art have been so complex and, consequently, expensive, that their apparent advantage over simpler mechanisms employing snap-acting switches has been all but eliminated. Nevertheless, if a simple, inexpensive and yet reliable incrementally operated timer could be provided, snap-acting type switches would be eliminated, and the cost of automatic dishwashers, clothes washers and the like would be materially reduced.

Accordingly, a particular object of the present invention is to provide a new and improved, inexpensive and yet reliable device for controlling the operation of automatic dishwashers, clothes washers or similar machines.

Another object of the present invention is to provide a new and improved controller for operating a rotary switch in discrete incremental steps.

Still another object of the present invention is to provide a new and improved controller for converting continuous rotation of a shaft into incremental rotation.

A further object of the present invention is to provide a new and improved timer for supplying rapid incremental rotary movement to drive a sequential type rotary operated switch.

Further objects and advantages and a better understanding of the present invention will be had from the following detailed description taken in connection with the drawings, wherein:

Fig. 1 is a partially sectioned elevational view of a control unit for an automatic dishwasher;

Fig. 2 is a fragmentary sectional view of the device of Fig. 1 taken along the line 2—2 thereof;

Fig. 3 is a fragmentary sectional view of a portion of the device of Fig. 1 taken along the line 3—3 thereof;

Figs. 4 and 5 are fragmentary sectional views similar to Fig. 3 but showing the cams in different positions; and Fig. 6 is an exploded isometric view of a portion of the device of Fig. 1 showing that portion of the apparatus used to convert the continuous rotation of the drive motor shaft to quick acting incremental rotation of an output member.

Briefly, devices embodying the present invention essentially comprise a pair of coacting members individually driven by a single motor and provided with irregularities on the contacting surfaces thereof so that the rotation of one member is selectively prevented by the position of the other member relative thereto, the control member being driven through a lost motion connection and the controlled member being driven through a torsion spring. In this way, the desired incremental rotation of the controlled member is achieved, since as the shaft of the drive motor continuously rotates, energy is periodically stored in the torsion spring unitl the control member is rotated to a position wherein it releases the controlled member, at which time the controlled member quickly rotates in response to the torque supplied thereto from the torsion spring until it is again impeded by the control member.

Referring now to the drawings, there is illustrated in Fig. 1, by way of example, a dishwasher control unit generally designated at 10. It should be understood that the application of the timer to a dishwasher is merely one example of the manner in which a timer of the present invention may be used to control an electric appliance or other mechanism in which a plurality of switches or other control devices are employed for sequentially and selectively supplying energy to different operating elements thereof. As illustrated, the control unit 10 comprises a housing 35 which may be suitably secured to the rear surface of an exposed wall of the dishwasher (not shown) to enable manipulation of the controls thereof by the housewife or other user of the device. Also, an index may be provided on the exposed wall of the dishwasher to coact with a pointer on the switch control shaft of the timer to enable the housewife to know the portion of the over-all cycle in which the machine is operating and thus to enable her to reposition the switch so as to adjust the length of selected parts of the cycle. For this purpose, a switch control shaft 14 of the switch controller 15 extends outside the housing 35 at 14a to accommodate a pointer as well as a knob or other suitable handle (not shown) thereby to facilitate manual control of the operation of the dishwasher. If, for example, the housewife feels that additional rinse time is desirable at the termination of the rinse portion of the over-all cycle, she may rotate the shaft 14 so that the proper switch elements are again closed to additionally rinse the dishes in the washer.

Switch controllers of the type shown at 15 in the drawings are well known to those skilled in the art and need not be described herein. Briefly, however, the controller 15 includes, in addition to the shaft 14, a plurality of switch actuating cams 16 spatially arranged on the shaft 14 for rotation therewith, and a plurality of double pole single throw switches 18 disposed respectively beneath the cams 16 for selective actuation thereby. Although not shown in the drawings it will be understood that each of the switches 18 is connected to a different portion of the control circuit of the dishwasher, thereby sequentially to initiate and terminate the various functions performed by the washer, and since the shaft 14 is rotated in small, rapid increments as it traverses its full 360 degree path, the switches 18 may be of the simple make and break type without special provisions for minimizing arcing.

For the purpose of intermittently supplying torque to the shaft 14 to cause stepped rotation thereof and for enabling manual rotation of the shaft 14 independent of the drive unit 12, a motor and gear reduction drive unit 12 is suitably secured to the outside of the housing 35 and a conversion and clutch drive unit 13 is operatively interconnected between the output gear 11 of the drive unit 12 and a drive gear 57, the latter gear being secured to the shaft 14 near the inner end thereof. As will be hereinafter explained, when the gear 11 slowly rotates, as, for example, at an angular velocity of one or two revolutions per hour, the unit 13 functions to effect incremental rotating of the shaft 14 so that contact in the switches 18 is quickly made or broken at predetermined intervals as the shaft 14 traverses a complete 360 degree arc.

It should be understood that the relative positions of the conversion and clutch drive unit 13 and the shaft 14 as shown in Fig. 1 have been selected merely to illustrate one manner in which the unit 13 may be incorporated into a compact controller structure suitable for employment in automatic clothes washers, dishwashers or any other similar apparatus. For example, the shaft 14 and associated switch control cams 16 may be aligned with the output shaft of the control unit 13 or may be mounted in any other relative position which may be deemed desirable and expedient. Consequently, the showing in Fig. 1 of the shaft 14 disposed parallel to and in offset relationship with respect to the principal axis of the output shaft of the unit 13 should not be considered as limiting the scope of the present invention but merely as an illustration of one practical controller in which the present invention is employed to effect efficient and reliable operation. Moreover, although in the described embodiment of the invention as shown in Fig. 1 a gear reduction unit is employed to couple torque from the conversion and clutch drive unit 13 to the switch actuating cams 16, it will be understood that in some applications it may be desirable to provide a step-up connection, a direct connection, or even a flexible connection between the conversion and clutch drive unit 13 and the shaft 14. Similarly, and as will become clear from the ensuing description, the conversion and clutch drive unit 13 operates equally well in any position of orientation with respect to the horizontal.

In accordance with the present invention, and as best shown in Fig. 6, the conversion and clutch drive unit 13 comprises a support stud 30 having one end 31 which is of reduced cross-section, press fitted into an aperture 33 in the controller housing 35. A flat gear 21 is loosely mounted on the stud 30 and in order to enable substantially free rotational movement of the gear 21, a suitable bearing in the form of a flat washer 37 is disposed, as shown, between the gear 21 and the wall of the housing 35. The gear 21 is selected and the aperture 33 is positioned so that the gear 21 mates with and is driven by the pinion gear 11 which protrudes into the housing 35 through an aperture 35a provided in the wall thereof.

Loosely mounted on the stud 30 above the gear 21 (as viewed in Fig. 6) is an output pinion gear assembly 17 which consists of a gear portion 17a press fitted on a sleeve bearing portion 17b. A rotor member 19 having a pair of semi-cylindrical ears 22a and 22b on diametrically opposed portions of the periphery thereof is provided with a centrally disposed aperture 19a through which the sleeve 17b extends. The rotor 19 is fixedly secured to the sleeve 17b as by bonding or press fitting so as positively to drive the gear 17a. Moreover, the gear assembly 17 may rotate freely with respect to the gear 21 by virtue of an annular spacer and bearing member 40 which is interposed between the top face of the gear 21 and the bottom face of the rotor 19. The various parts are maintained in assembled condition on the stud 30 by means of a snap ring 44 which is received in an annular groove 30a near the top of the shaft 30.

In order to provide energy for quickly rotating the gear 17 when the rotor 19 is freed in a manner to be described hereinafter, a coil spring 23, which surrounds the spacer 40, has the upper and lower ends thereof, 23a and 23b, respectively, bent over to form hooks. As shown, a struck-out tab 21a on the gear 21 engages the lower hooked end 23b of the spring 23 and a wall of a slot 19b in the edge of the rotor 19 engages the upper hooked end 23a of the spring 23. It may thus be seen that as the gear 21 is rotated in a counterclockwise direction, as viewed from the top in Fig. 6, a counterclockwise torque is coupled to the rotor 19, and if the rotor 19 is prevented from rotating while the gear 21 is rotated, the spring 23 is wound and energy is stored therein. Consequently, if the rotor 19 is released after the spring 23 has been completely or even partially wound, it will be rotated by the torque supplied thereto from the spring 23. Moreover, by abruptly holding and releasing the rotor 19 in a periodic manner as the gear 21 is continuously rotated, rapid incremental periodic rotation of the gear 17 may be effected.

Accordingly, there is provided an arrangement for selectively stopping and freeing the rotor 19 in a prearranged time pattern. This arrangeemnt comprises a gear 27 driven from the gear 21, a control or detent member 24 which operatively engages the rotor 19, and a lost motion connection 29 for coupling torque from the gear 27 to the detent 24. More specifically, that portion of the unit 13 which effects the intermittent holding and releasing of the rotor 19 includes a support stud 26 having one end 26a, which is of reduced cross-section, press fitted into an aperture 50 in the housing 35. The lost motion connection 29, which consists of a lower partially cylindrical member 47 of less than 180 degrees and an upper partially cylindrical member 48 of less than 180 degrees adapted operatively to be interengaged such that one member may rotate the other, is mounted as shown for free rotation on the stud 26. By connecting the lower member 47 to the gear 27 and the upper member 48 to the detent 24, a driving torque supplied to the gear 27 is transmitted to the detent 24. While it will be understood that any suitable means may be employed for connecting the member 47 to the gear 27 and the member 48 to the detent 24, it has been found desirable to bond the member 48 directly to the lower face of the detent 24 and to press fit the member 47 into a central aperture 27a in the gear 27 and the member 47 being loosely fitted on the stud 26. The member 47, thus provides a suitable bearing for enabling freedom of rotation of the gear 27 on the stud 26. A helical spring 53 is secured in an annular groove 51 near the upper end of the stud 26 so as to maintain the detent 24, connection 29 and gear 27 in an assembled relation.

The gear 27, as shown in Fig. 6, meshes with and is driven by the gear 21 and as is apparent from the drawings, the constant radius edges of the detent 24 provide a stop against which the ears 22a or 22b on the rotor 19 abut to prevent rotation of the gear 17. However, a pair of semi-cylindrical recesses 24a and 24b are provided at diametrically opposed locations in the periphery of the detent 24 which when engaged by one of the ears 22a or 22b permit rotation of the rotor 19. Since the detent 24 is driven in a clockwise direction by the lost motion connection 29, when one of the recesses 24a or 24b therein is rotated to a position in which it receives an ear 22a or 22b, the torque exerted on the rotor 19 by the spring 23 abruptly rotates the rotor 19 and the detent 24. The detent 24 rotates until the end of the lost motion connection is reached and the rotor 19 rotates until one of the protrusions 22a or 22b thereon engages the periphery of the detent 24 intermediate the recesses 24a and 24b therein. Since there are two protrusions on the rotor 19, the gear 17 rotates one-half a revolution each time the rotor 19 is released. Also, since there are two recesses in the detent 24, the rotor 19 is released every one-half revolution of the gear 27. Consequently, since in the embodiment of the invention which is shown the gears 21 and 27 are selected to have equal diameters, the gear 17 is periodically rotated in rapid, incremental steps.

Since motor and reduction gear units of the type generally used in timers of the present type cannot be driven either reversely or forwardly from the output shaft without damage to the device, and since as discussed above it is desirable that the housewife be able to rotate the shaft 14 in order to set the controller ahead, an over-running friction clutch 51 is employed to couple torque from the gear 17 to the gear 57 which is attached to the shaft 14. Although any type of over-running clutch may be utilized for the purpose, a clutch of the type shown in Fig. 1 which is particularly applicable to such a drive unit, is generally indicated, this particular clutch construction being disclosed in detail in a copending Daugherty application, Serial No. 293,127, filed June 12, 1952. Essentially, the over-running clutch 51 comprises an input gear 52 which mates with the gear 17 and which is coupled through a spring member 54 to an output disk 55 which is secured to an output pinion 58. Because rotation of the input gear 52 causes rotation in one direction of the output gear 58 while the gear 58 may be rotated in the same direction independently of the gear 52, shaft 14 may be manually rotated in a forward direction without damage to the motor unit 12 thus enabling the housewife to advance the shaft 14 to any desired position. Should, however, an attempt be made to rotate the shaft 14 in a reverse direction, no harm is done to the drive unit 12 since a reverse torque cannot be coupled from the gear 17 to the gear 11.

Although the operation of the device as thus far described will be clear from a reading of the heretofore given description, a brief reiteration of this operation may be helpful in clarifying certain aspects of the invention. Consequently, referring particularly to Figs. 2, 3, 4 and 5, it will be seen that when the pinion gear 11 is first rotated by the unit 12 the gears 21 and 27 are both driven so that the lower member 47 of the lost motion connection 29 rotates in a clockwise direction until the forward face thereof engages the rearward face of the upper member 48, thereafter the detent 24 rotates in unison with the gear 27. Assuming that the detent 24 is in the position shown in Fig. 3, it will be seen that the ear 22a on the rotor 19 engages the constant radius portion of the surface of the detent 24 intermediate the recesses 24b and 24a and is thereby prevented from rotating in a counterclockwise direction. As the pinion 11 continues to rotate, the gear 21 is driven in a counterclockwise direction thereby to wind the torsion spring 23 from the bottom since the upper hooked end 23b is held fast by the stationary cam member 19. Rotation of the pinion 11 thus winds the spring 23 to store energy therein until the detent 24 has rotated to that position at which the recess 24b partially receives the protrusion 22a on the rotor 19. At this time the counterclockwise torque which is exerted on the rotor 19 by the wound torsion spring 23 exerts a tangential force on the detent 24 thereby causing it to rotate in a clockwise direction (Fig. 4), the upper member 48 moving away from the lower member 47 of the lost motion connection 29. Therefore, the rotor 19 is free to rotate until the other protrusion 22b engages the constant radius portion of the detent 24 intermediate the recesses 24a and 24b (Fig. 5). The lower member 47 of the connection 29 then continues to rotate in response to the rotation of the pinion gear 11 until the forward face thereof once more engages the rearward face of the upper member 48 thereby to again rotate the detent member 24. At this time the torsion spring 23 has been partially wound and will be further wound until the recess 24a is engaged by the ear 22b at which time the cycle is repeated. It may thus be seen that the gear 17, which is rigidly secured to the rotor 19, rotates through 360 degrees in rapid 180 degree incremental steps.

Since it is usually desirable that the sequence switch 15 not be rotated through a full 180 degrees it may be desirable to provide a larger number of protrusions 22 on the rotor member 19 or, as in the embodiment shown in Fig. 1, the gear 57 may be of considerably greater diameter than the gear 58 so as to provide a gear reduction coupling between the pinion 17 and the shaft 14 of the sequence switch 15.

While there has been described what is at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. In a drive mechanism, the combination of a member adapted to be continuously rotated, a torsion spring having one end thereof effectively secured to said member, means rotatably mounted and secured to the other end of said spring, and stop means rotated by said member for periodically engaging and stopping said last mentioned means to cause intermittent rotation thereof.

2. A timer control device, comprising a motor having a continuously rotatable shaft, a first rotatable member having a plurality of protrusions on the surface thereof, a second rotatable member having a surface including a plurality of recesses substantially corresponding in size to said protrusions, the surface of said members having said protrusions and recesses in operative engagement with one another, a driving connection including torsion spring between said shaft and one of said members, and a driving connection including a lost motion mechanism between said shaft and the other of said members.

3. A switch controller comprising, a motor having a continuously rotatable output member, a rotatable drive member having a detent surface thereon, a torsion spring for coupling said output member to said drive member, said detent surface being provided with at least one protrusion, a rotatable control member disposed parallel to said drive member and having a detent surface thereon which is provided with at least one recess, the surface of said last named detent adjacent said recesses being such as to engage said protrusion to prevent rotation of said drive member except when said protrusion is disposed in said recess, and rotatable means for rotating said control member in a direction opposite to the torque supplied to said drive member through said torsion spring, said rotatable means including an arrangement permitting substantial freedom of movement of said control member only in the direction of rotation of said rotatable means.

4. A drive mechanism for operating a controller or the like, comprising motor means, spring means adapted to store energy supplied from said motor means, output means adapted to be rotatably driven by said spring means, rotatable stop means tangentially related to said output means for preventing rotation of said output means, said stop means being periodically rotated by said motor means out of effective engagement with said output means, whereby said output means is periodically rotated by said spring means in response to continuous rotation of said motor means.

5. In a snap-acting type switch controller, the combination of drive means, first gear means mounted so as to be rotated by said drive means, spring means connected at one end to said first gear means, a rotor, said spring means being connected to said rotor for moving it in response to rotation of said first gear, at least one irregularity on the surface of said rotor, a detent rotatably mounted for operative engagement with said irregularity to prevent rotation of said rotor, and means including a lost motion connection for rotating said detent from said drive means thereby periodically to disengage said rotor.

6. In apparatus of the type described, the combination of a first stud, a second stud mounted parallel to said first stud, first and second mutually interacting members rotatably mounted on said studs for effective interengagement, a torsion spring secured at one end to said first member and surrounding said first stud, motor means for rotating said second member and for winding said torsion spring, and a lost motion connection between said motor means and said second member to permit the first member acting under the control of the torsion spring to rotate the second member a predetermined amount.

7. A timer comprising a control member, a drive member, said members being rotatably supported in parallel relationship, detent surfaces on said members, said detent surfaces contacting one another, protrusions on one of said surfaces, means defining indentations on the other of said surfaces, said indentations being adapted operatively to receive said protrusions, motor means, spring means connecting the output of said motor means to said drive member, and lost motion means connecting the output of said motor means to said control member, whereby rotation of said drive member is controllable by said control member.

8. A controller comprising drive means, first driven means, spring means operatively connecting said drive means and said first driven means, second driven means for selectively preventing rotation of said first driven means, and lost motion means for rotating said second driven means in response to operation of said drive means.

References Cited in the file of this patent

UNITED STATES PATENTS

| | | |
|---|---|---|
| 1,891,101 | Le Count | Dec. 13, 1932 |
| 2,106,042 | Stark | Jan. 18, 1938 |
| 2,227,133 | Hall | Dec. 31, 1940 |
| 2,460,000 | Flanigan | Jan. 25, 1949 |
| 2,598,448 | Schultz | May 27, 1952 |
| 2,679,357 | Rosenberger | May 25, 1954 |